F. P. FENTRESS.
MOTOR CYCLE AXLE STRUCTURE.
APPLICATION FILED OCT. 16, 1912.
1,067,723. Patented July 15, 1913.
Fig. 1.
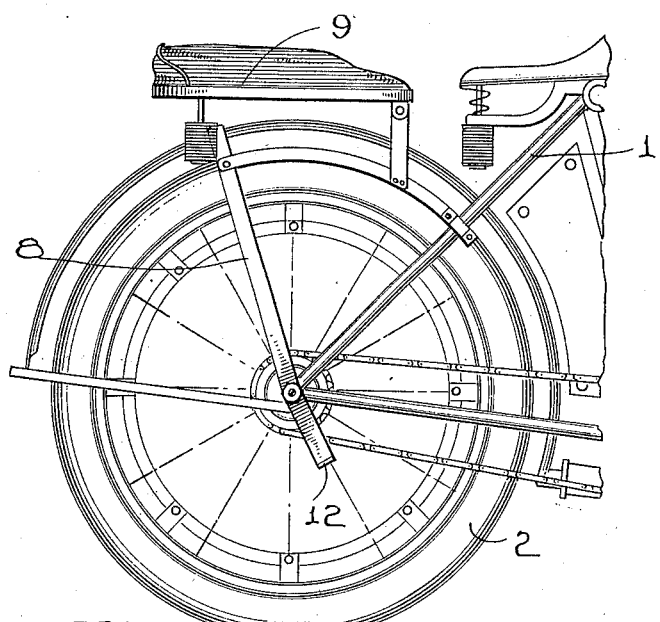
Fig. 2.
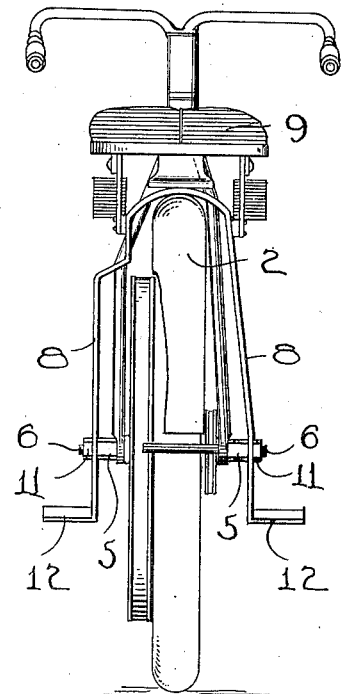
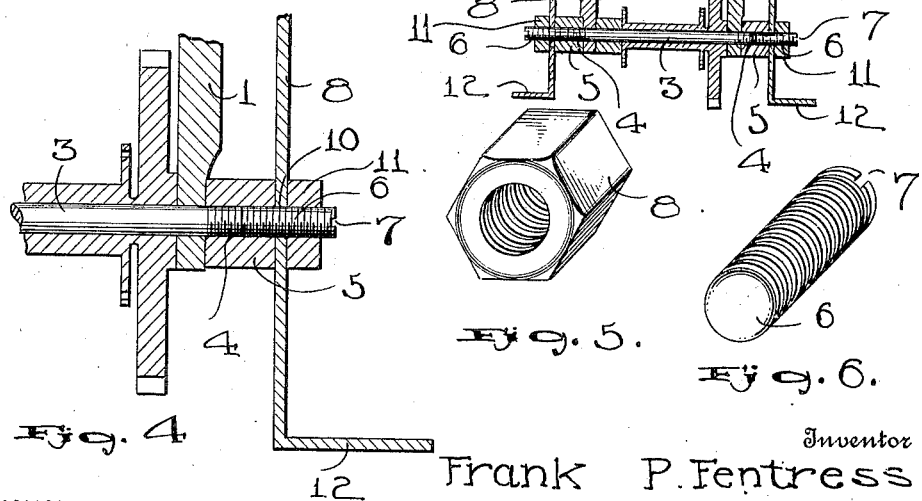
Fig. 4. Fig. 5. Fig. 6.
Witnesses
Inventor
Frank P. Fentress
By
his Attorney

UNITED STATES PATENT OFFICE.

FRANK P. FENTRESS, OF TACOMA, WASHINGTON.

MOTOR-CYCLE AXLE STRUCTURE.

1,067,723.  Specification of Letters Patent.  Patented July 15, 1913.

Application filed October 16, 1912. Serial No. 726,146.

*To all whom it may concern:*

Be it known that I, FRANK P. FENTRESS, a citizen of the United States, residing at Tacoma, in the county of Pierce and State of Washington, have invented certain new and useful Improvements in Motor-Cycle Axle Structures, of which the following is a specification, reference being had therein to the accompanying drawing.

This invention relates to extension axles for motorcycles, for the purpose of extending the axle in such a manner, as to sufficiently support the legs of a motorcycle seat attachment.

The principal object of this invention is the production of a simple and efficient extension axle whereby the legs of the motorcycle seat attachment will be efficiently held in engagement with the frame and at the same time may be removed from the motorcycle frame without detaching the rear wheel of the motorcycle frame.

Other objects and advantages of the present invention will appear throughout the following specification and claim.

In the drawings: Figure 1 is a side elevation of the seat attachment secured to the rear of the motorcycle. Fig. 2 is a rear view of the motorcycle showing the manner of supporting the legs of the seat attachment upon the motorcycle. Fig. 3 is an enlarged longitudinal sectional view through the rear axle of the motorcycle. Fig. 4 is an enlarged sectional view of the means for connecting the legs of the seat attachment to the rear axle. Fig. 5 is a detail perspective of the nut used in connection with the present device. Fig. 6 is a detail perspective of the threaded core used in connection with the present invention.

By referring to the parts by numerals it will be seen that 1 designates the frame of the motorcycle which is supported by means of the rear wheel 2 which rear wheel is secured to the frame 1 by means of an axle 3. The axle 3 projects upon each side through the frame 1 and is provided with the threaded portion 4. A binding nut 5 is threaded upon the threaded portion 4 of the axle 3 and is threaded tightly so as to hold the frame 1 upon the axle 3. The threaded portion 4 of the shaft 3 extends only partially through the nut 5 and into the unoccupied portion of the nut 5 is threaded the threaded core 6. This threaded core 6 is provided with a notch 7 upon its outer end for facilitating the placing of the core 6 into threaded portion of the nut 5. This core 6 does not extend entirely into the nut 5, but protrudes therefrom so as to constitute a support for the legs 8 of the seat attachment 9. These legs 8 are provided with apertures 10 through which the cores 6 pass. Locking nuts 11 are then threaded upon the outer ends of the cores 6 and firmly bind the legs 8 against the nuts 5. The legs 8 are, of course, provided with the usual foot rests 12.

From the foregoing description it will be seen that a very simple and efficient device has been produced which may efficiently support the legs of a seat attachment in such a manner as to cause the seat attachment to be supported independently of the axle 3. It will be seen that, owing to the fact that the core 6 is independent of the axle 3, the core 6 and nuts 11 may be removed from the axle without interfering with the rear wheel, therefore avoiding the possibility of the wheel 2 coming out of its correct alinement. It will be further obvious that a very simple and efficient device has been produced which may be manufactured at a very minimum cost.

What is claimed is:

A motorcycle axle-structure comprising a main axle, said axle adapted to support a rear wheel and frame of a motorcycle and provided at each end with a protruding threaded portion, binding nuts positioned upon said protruding threaded portions for holding the frame and wheel of the motorcycle upon said axle, said threaded portions of said axle extending partially through said binding nuts, threaded cores threaded into said binding nuts and projecting therefrom for constituting a detachable support for the legs of a seat attachment of a motorcycle, and a locking nut threaded upon said threaded cores for firmly binding the legs of a motorcycle seat attachment in engagement with the motorcycle.

In testimony whereof I hereunto affix my signature in presence of two witnesses.

FRANK P. FENTRESS.

Witnesses:
  M. W. SHIELS,
  G. R. GARDNER.

Copies of this patent may be obtained for five cents each, by addressing the "Commissioner of Patents, Washington, D. C."